UNITED STATES PATENT OFFICE.

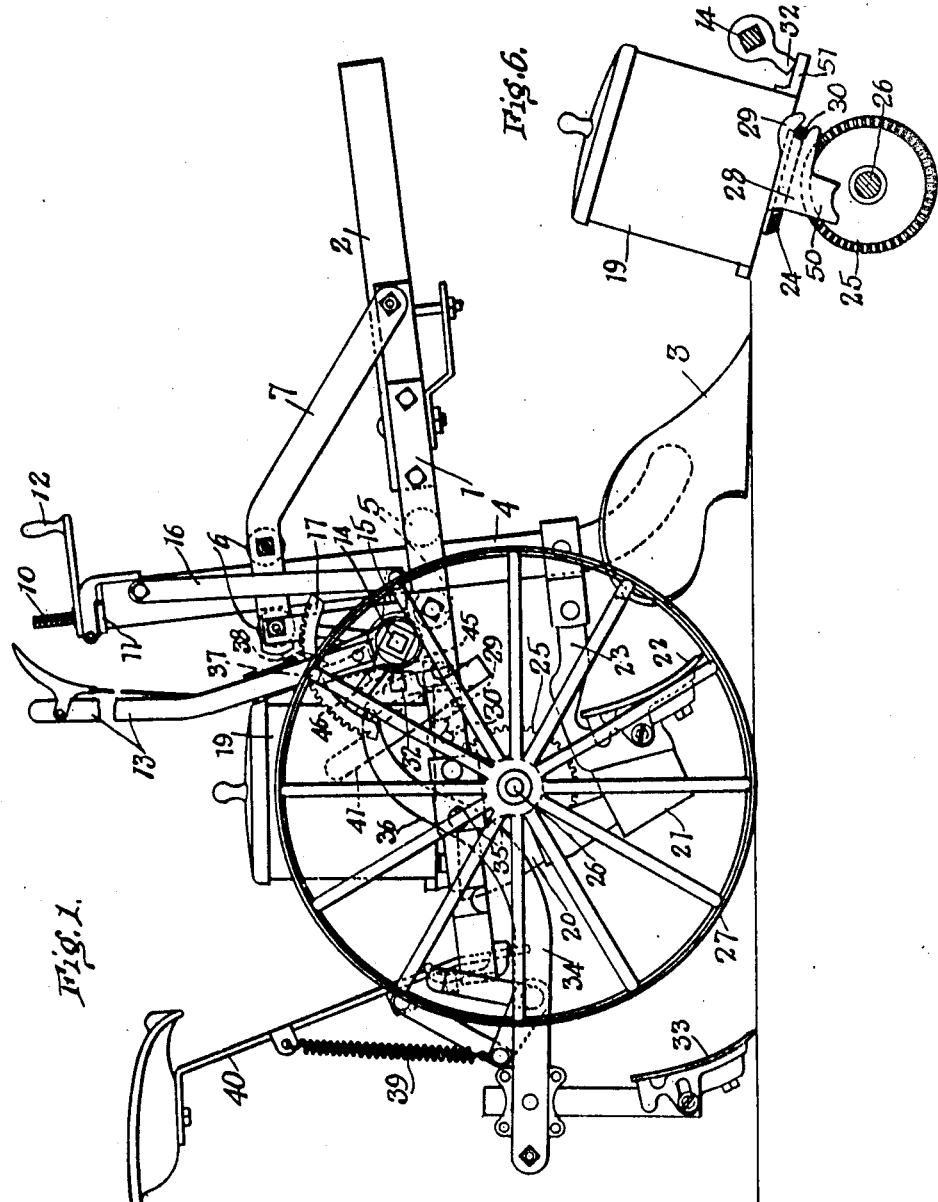

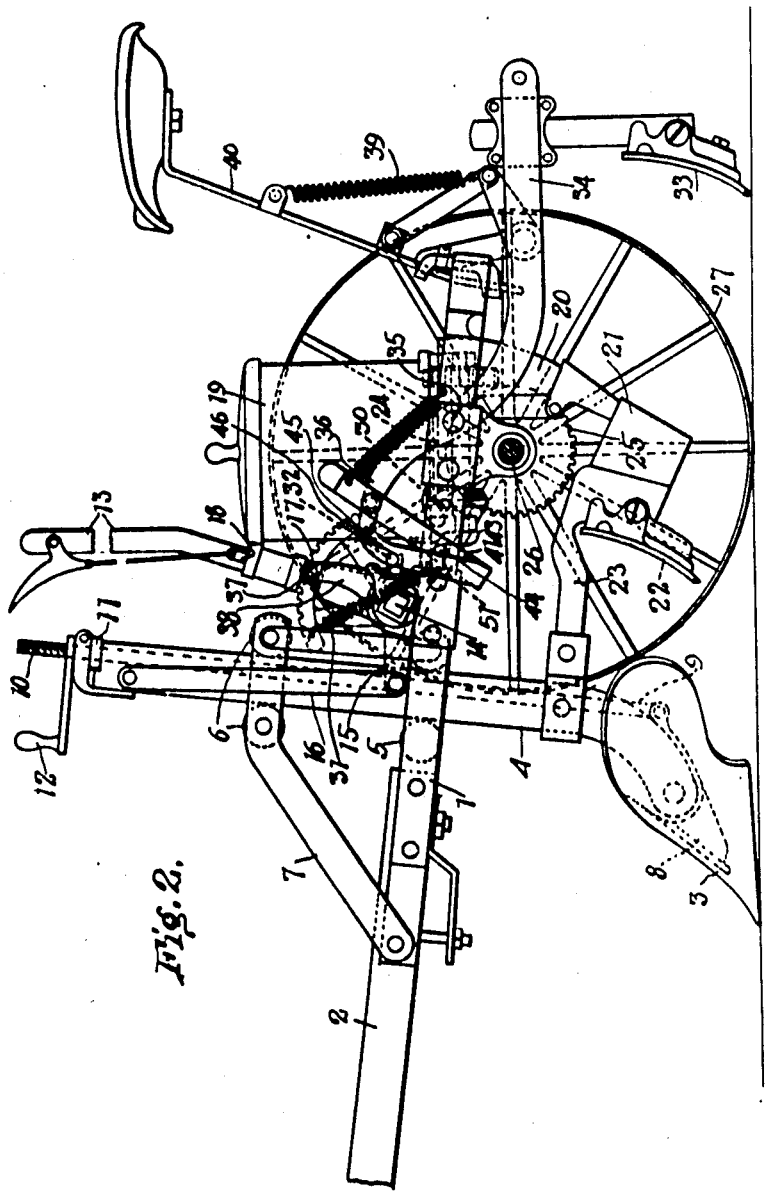

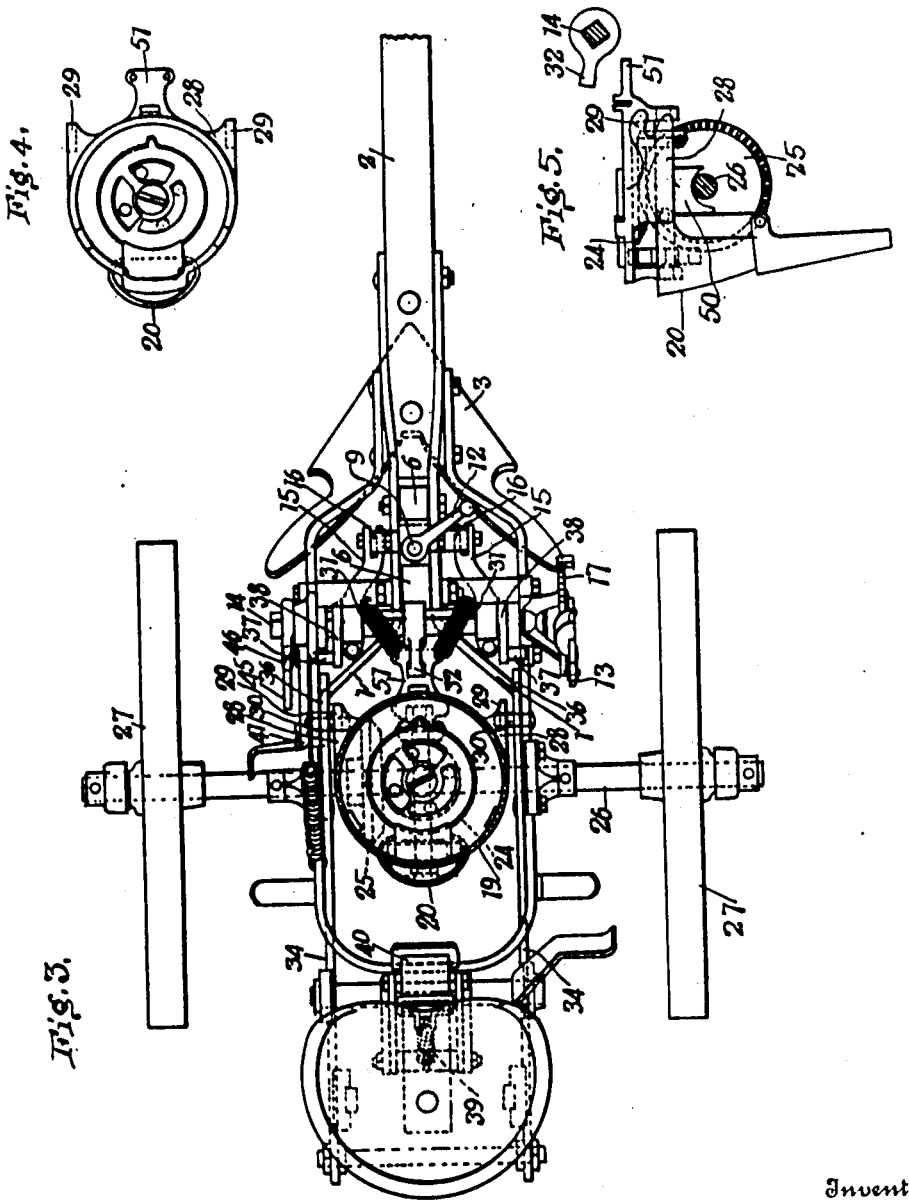

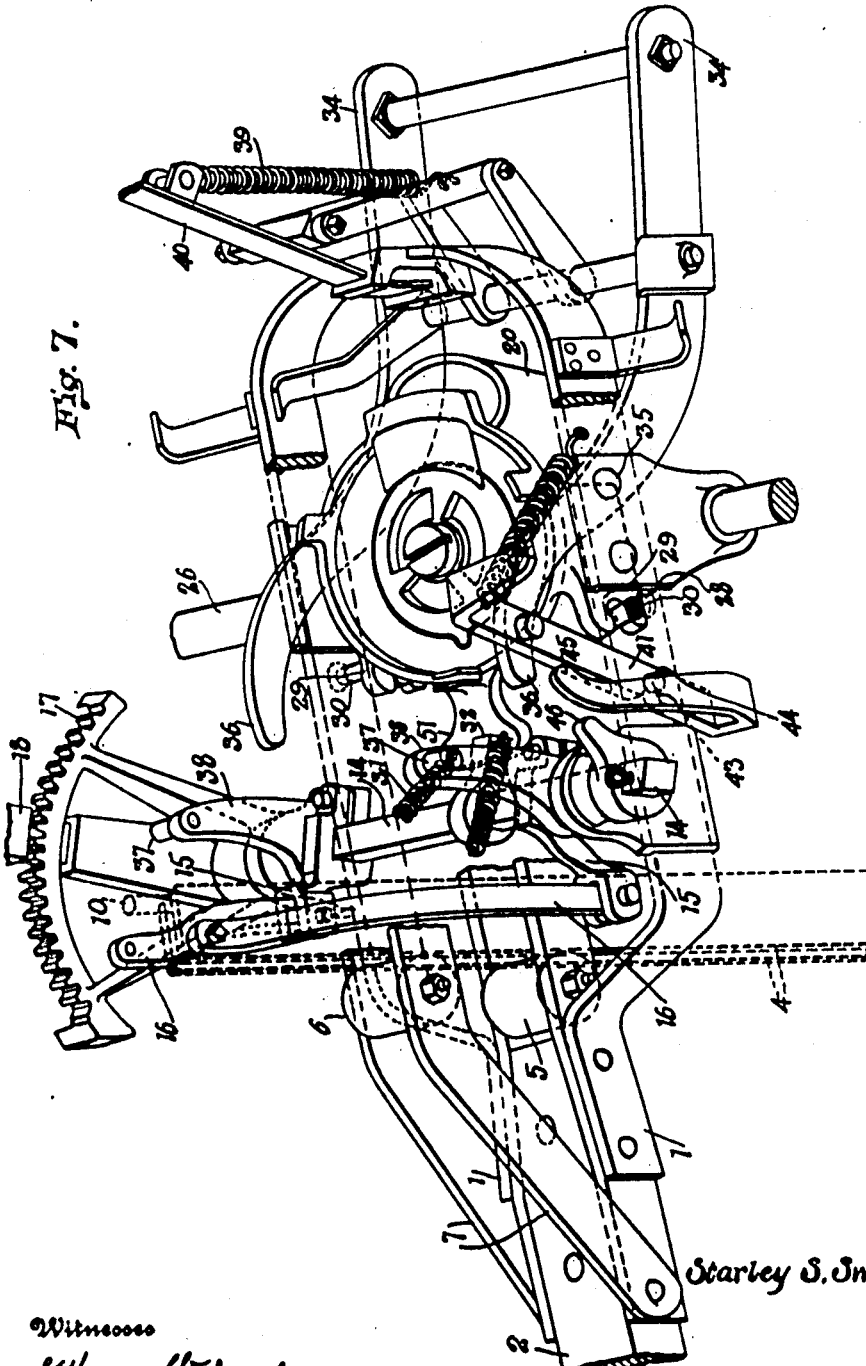

STARLEY S. SWANSON, OF BELLEVUE, OHIO, ASSIGNOR TO THE OHIO CULTIVATOR COMPANY, OF BELLEVUE, OHIO, A CORPORATION OF OHIO.

PLANTER AND THE LIKE.

1,186,954.

Specification of Letters Patent.   Patented June 13, 1916.

Application filed July 17, 1913.   Serial No. 779,427.

*To all whom it may concern:*

Be it known that I, STARLEY S. SWANSON, a citizen of the United States, residing at Bellevue, in the county of Huron and State of Ohio, have invented certain new and useful Improvements in Planters and the like, of which the following is a specification, reference being had therein to the accompanying drawing.

This invention relates to planters and the like and the object of the invention is to provide a construction whereby the manipulation of a single operating lever will positively move the furrow opener and the covering shovels out of engagement with the ground and will positively disconnect the feeding device from its driving mechanism, and will so time the movements of these parts that they will cease to operate at a common point, that is, the seed will be planted and covered to the end of the furrow opened by the furrow opener; to provide means for locking the covering shovels in their operative positions and for releasing the same; to so construct and arrange the feeding devices that they can be bodily removed from the machine either for the purpose of emptying the hopper or when it is desired to use the machine as a plow and not as a planter; and further, to provide a very simple, durable construction which will be positive in its adjustments.

In the accompanying drawings, Figure 1 is a side elevation of a planter embodying my invention; Fig. 2 is an elevation of that side of the machine opposite that shown in Fig. 1 with one of the ground wheels broken away; Fig. 3 is a top plan view of the machine; Fig. 4 is a detail plan view of the feeding mechanism; Fig. 5 is a detail elevation of the lower part of said feeding mechanism with the hopper removed; and Fig. 6 is a detail view showing the hopper in its inoperative position, and Fig. 7 is a skeletonized perspective view of the machine.

In these drawings I have illustrated one embodiment of the invention and have shown the same as comprising a main frame 1 having the usual tongue or pole 2. Supported by this frame near its forward end is a furrow opener which, in the present instance, is shown as a shovel 3. This furrow opener is adjustable both with and independently of the movements of the other parts carried by the frame. To permit of its adjustment relatively to the frame, in either manner, it is mounted upon a shank 4 extending upwardly between suitable guides 5 on the frame 1 and other guides 6 on supplemental frame members 7 arranged above the main frame. A shovel-carrying shoe 8 is pivotally mounted at the lower end of the shank 4 and has pivotally connected therewith a rod 9 which extends upwardly through the shank and has its upper end screw-threaded, as shown at 10. Mounted on this screw-threaded portion is a nut 11 having a handle 12, the manipulation of which will cause the shovel 3 to move about its pivotal connection to the shank to adjust it with relation to the ground line. The bodily adjustment of the shovel is imparted thereto by means of a lever 13 and is preferably secured in properly timed relation to the movements of the other parts, as hereinafter described. The lever 13 is mounted on a shaft 14 journaled in suitable bearings on the main frame and having forwardly projecting fingers 15 which are arranged on opposite sides of the shank and connected at their forward ends to links 16 extending upward and pivotally connected to the shank at their upper ends. Thus, the rotation of the shaft 14 will cause the shank 4 and the shovel 3 to be moved upward or downward according to the direction of rotation of the shaft. The lever 13 is retained in adjusted positions in any suitable manner. As here shown, the usual toothed segment 17 coöperates with a slidable dog 18 mounted on the lever.

A feeding hopper 19 is supported by the main frame and provided with a depending chute 20 extending into a boot 21 arranged in the rear of a supplemental furrow opener 22. Both the boot and the supplemental furrow opener are carried by an arm 23 rigidly secured to and extending rearwardly from the shank 4 on the main furrow opener thus causing the supplemental furrow opener and the boot to be adjusted simultaneously with the bodily adjustment of the main furrow opener.

The feeding devices which are arranged within the hopper 19 are of an ordinary character and need not be described in detail. Suffice it to say that they are actuated by a gear 24, which constitutes a part of said feeding devices and which in turn is driven by a gear 25, this latter gear being driven in a well known manner from an axle 26 which carries the main frame and upon which are mounted ground wheels 27. The feeding devices are capable of bodily movement toward and away from the driving gear 25 to enable the said gear to be connected with or disconnected from the same. Preferably, the feeding devices as a whole are mounted upon a supplemental frame 28 comprising two side members or arms extending forwardly and provided at their forward ends with open bearings or hub shaped portions 29 adapted to engage pins 30 carried by the main frame. The supplemental frame also has downwardly extending portions 50 having their lower edges curved to engage the axle 26 and support the feeding devices when they are in their operative positions. Movement may be imparted to the supplemental frame in any suitable manner to move the feeding devices into and out of operative positions. In the present instance the supplemental frame has a forwardly projecting lip 51, preferably arranged centrally of the frame and in a position to be engaged by a finger 32 on the shaft 14 when said shaft is actuated. The lip 51 is connected by means of springs 31 with a fixed part of the machine, such as the upright arms forming a part of the supplemental frame 7. These springs tend to move the supplemental frame about the axis of the pins 30 to cause the gear 24 of the feeding devices to engage with the driving gear 25 and to maintain said gears in engagement. Thus, movement is imparted to the frame in one direction, to disconnect the feeding devices from the driving gear, by means of the lever 13 and in the other direction, to connect the feeding devices with the driving gear, by means of the springs 31 combined with the weight of the feeding devices. The arrangement of the finger 32 is such that the operation of the lever 13 to elevate the furrow opening shovel will also cause the finger to engage the lip of the supplemental frame and move the latter about its axis, thus positively moving the feeding mechanism out of engagement with its driving gear. The position of the finger 32 with relation to the fingers 15 is such that the movement of the feeding devices will take place after the movement of the furrow opener has been accomplished, thus causing the feeding of the seed to continue to the end of the furrow which has been opened.

The furrow covering shovels are shown at 33 and are carried by an auxiliary frame 34 which is pivotally mounted on studs 35 carried by the main frame and is provided with upwardly and forwardly extending portions 36 arranged respectively in the paths of pins or projections 37 carried by fingers 38 rigidly secured to the shaft 14.

When the lever is moved rearwardly to move the furrow opening shovel out of engagement with the ground and to disconnect the feeding devices from their driving mechanism the pins 37 will engage the respective portions of the auxiliary frame and rock the latter about the axis of the studs 35 to move the furrow opening shovels out of engagement with the ground. The positions of the fingers 38 with relation to the fingers 15 and 32 is such that the movement of the frame carrying the covering shovels will take place after the movements of the furrow opener and of the feeding device, thus allowing the covering shovels to cover the furrow to its end. A spring 39 is connected with the auxiliary frame 34 and with the fixed part carried by the main frame, such as the seat standard 40, and tends to move the covering shovels 33 upward. The tension of this spring is such that the weight of the auxiliary frame and shovels will maintain the same normally in their operative position. I have, however, provided means whereby the shovels may be positively retained in their operative positions. This locking means, as herein illustrated, comprises a lever 41 secured to one of the forwardly projecting frame portions 36 of the auxiliary frame 34, extending downwardly therefrom and provided with a notch 43 arranged on the edge thereof in a position to engage a pin 44, carried by the main frame, when the covering shovels are in their normal operative positions, thus preventing the upward movement of the shovels and retaining the same in this position. It will be noted that the notch 43 is slightly inclined from its open end toward its closed end and downward pressure upon the auxiliary frame, in the rear of its pivotal support on the main frame, will disengage the lever from the pin to permit the shovels to be moved downward at the will of the operator, this being accomplished by the pressure of the foot upon the auxiliary frame or a part carried thereby. The lever 41 is released from the pin, to permit of the upward movement of the shovels, by a device actuated by means of the lever 13 and so arranged that it will release the lever just prior to the engagement of the frame portions 36 by the pins 37. As here shown this means consists of an arm 45 rigidly secured to the lever 41 and arranged to be engaged by a finger 46 rigidly secured to the shaft 14 and positioned slightly in advance of the arms 38 carrying the pins 37. Thus, when the lever 13 is actuated the finger 46 will engage the arm 45 and impart rearward movement to the lever 41 to disengage it from the pin 44 before the pins 37 of the arms 38 engage the forwardly projecting frame members. To raise the covering shovels independently of the lever 13 it is only necessary to press on the upper end of the lever 41 with the foot. This pressure will first release the lever from the pin 44 and then rock the auxiliary frame, on which the lever is mounted, to lift the shovels.

The operation of the mechanism will be readily understood from the foregoing description and it will be apparent that I have provided a planter which is very simple in its construction and operation and which is provided with a mechanism whereby the manipulation of a single part, such as the lever 13, will successively move the furrow opener, feeding mechanism and furrow covering shovels into their inoperative positions, the movement of these parts being accomplished in the order named and the movements of the several parts being separated at intervals of sufficient length to permit each part to operate to the full end of the furrow which has been opened by the furrow opener. Further, it will be noted that this mechanism by which this is accomplished is exceedingly simple in its construction and at the same time absolutely positive in its operation and of a very strong, durable character.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. In a planter, a furrow opener, a shaft, a positive connection between said furrow opener and said shaft, whereby the rotation of the shaft will move the furrow opener into or out of its operative position, an auxiliary frame, covering shovels carried thereby, and a part rigidly secured to said shaft and adapted to engage said auxiliary frame to impart movement to said covering shovels when said shaft is actuated to adjust said furrow opener, means for rotating said shaft and means under the control of the operator to impart movement to said auxiliary frame independently of said shaft.

2. A planter comprising a main frame, a shaft journaled thereon, means for imparting rotatory movement to said shaft, a furrow opener, an operative connection between said furrow opener and said shaft, an auxiliary frame pivotally mounted on said main frame and having a portion extending forwardly from its axis, covering shovels carried by said frame in the rear of its axis, a part carried by said shaft adapted to engage said forwardly extending part of said auxiliary frame when said shaft is rotated in one direction and a lever connected with said auxiliary frame for operating the latter independently of said shaft.

3. In a planter, a main frame, a shaft rotatably mounted thereon, means for actuating said shaft, a furrow opener, means actuated by said shaft for moving said furrow opener into an inoperative position, an auxiliary frame pivotally mounted on said main frame and having a part extending forwardly from its axis, covering shovels carried thereby, said main frame and said forwardly extending part of said auxiliary frame having parts coöperating to retain said covering shovels in their normal operative positions, and means actuated by the movement of said shaft to first actuate one of said retaining devices to release said auxiliary frame and to then actuate said auxiliary frame to move said shovels into their inoperative positions.

4. In a planter, a main frame, a shaft rotatably mounted thereon, means for actuating said shaft, a furrow opener, means actuated by said shaft for moving said furrow opener into an inoperative position, an auxiliary frame pivotally mounted on said main frame and having a part extending forwardly from its axis, covering shovels carried thereby, said main frame and said forwardly extending part of said auxiliary frame having parts coöperating to retain said covering shovels in their normal operative positions, means actuated by the movement of said shaft to first actuate one of said retaining devices to release said auxiliary frame and to then actuate said auxiliary frame to move said shovels into their inoperative positions, and means for releasing and actuating said auxiliary frame independently of said shaft.

5. In a planter, a main frame, a shaft rotatably mounted thereon, means for actuating said shaft, a furrow opener, means actuated by said shaft for moving said furrow opener into an inoperative position, an auxiliary frame, covering shovels carried thereby, said auxiliary frame having a part extending forwardly of its axis, a lever pivotally mounted on said forwardly extending part of said frame and having a recess therein, a pin carried by a relatively fixed part of said planter to enter said recess and lock said lever and said frame against movement in one direction, a part carried by said lever, and two fingers mounted on said shaft arranged one in advance of the other and adapted to engage successively the part carried by said lever and the forwardly extending portion of said frame.

6. In a planter, a main frame, a furrow opener adjustably mounted thereon, a shaft mounted on said main frame, means for imparting rotatory movement to said shaft, an operative connection between said shaft and said furrow opener to adjust the latter, a feeding device carried by said supplemental frame, driving mechanism for said feeding device carried by said main frame, said supplemental frame having a forwardly extending portion, a finger carried by said shaft adapted to engage said forwardly extending portion of said supplemental frame to move said supplemental frame about its pivotal center, an auxiliary frame also pivotally mounted on said main frame, covering shovels carried by said auxiliary frame, said auxiliary frame having a forwardly extending portion and a part carried by said shaft and adapted to engage said forwardly extending portion of said auxiliary frame, whereby the rotation of said shaft in one direction will adjust said furrow opener and said covering shovels and will disconnect said feeding device from its driving mechanism.

7. In a planter, a main frame, a furrow opener adjustably mounted thereon, a shaft mounted on said main frame, means for imparting rotatory movement to said shaft, an operative connection between said shaft and said furrow opener to adjust the latter, a supplemental frame pivotally mounted on said main frame, a feeding device carried by said supplemental frame, driving mechanism for said feeding device carried by said main frame, said supplemental frame having a forwardly extending portion, a finger carried by said shaft adapted to engage said forwardly extending portion of said supplemental frame to move said supplemental frame about its pivotal center, an auxiliary frame also pivotally mounted on said main frame, covering shovels carried by said auxiliary frame, said auxiliary frame having a forwardly extending portion and a part carried by said shaft and adapted to engage said forwardly extending portion of said auxiliary frame, whereby the rotation of said shaft in one direction will adjust said furrow opener and said covering shovels and will disconnect said feeding device from its driving mechanism, the parts carried by said shaft being so arranged that upon the rotation of said shaft the furrow opener, feeding mechanism and covering shovels will be successively moved into inoperative positions.

8. In a planter, a main frame, a shaft journaled thereon, means for imparting rotatory movement to said shaft, bearing lugs carried by said main frame, a supplemental frame having bearings to engage said bearing lugs and having a part extending forwardly therefrom, a feeding device carried by said supplemental frame, a driving mechanism for said feeding device mounted on said main frame, and a finger carried by said shaft and arranged to engage said forwardly extending part of said supplemental frame to move the same about the axis of said bearing lugs to disconnect said feeding device from its driving mechanism.

In testimony whereof, I affix my signature in presence of two witnesses.

STARLEY S. SWANSON.

Witnesses:
E. H. EHRICH,
M. KINNEY.

Copies of this patent may be obtained for five cents each, by addressing the "Commissioner of Patents. Washington, D. C."